(12) United States Patent
Zellner

(10) Patent No.: US 7,623,849 B2
(45) Date of Patent: Nov. 24, 2009

(54) METHOD, SYSTEM, AND STORAGE MEDIUM FOR PROVIDING COMPREHENSIVE ORIGINATOR IDENTIFICATION SERVICES

(75) Inventor: Samuel Zellner, Dunwoody, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 0 days.

(21) Appl. No.: 10/713,939

(22) Filed: Nov. 13, 2003

(65) Prior Publication Data

US 2005/0107074 A1 May 19, 2005

(51) Int. Cl.
*H04M 3/42* (2006.01)
(52) U.S. Cl. ............. 455/415; 379/142.01; 379/142.02; 379/142.04; 379/142.06; 455/412.1
(58) Field of Classification Search .................. 370/352; 455/415, 412; 379/142.04, 142.01, 142.02, 379/142.06
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |

(Continued)

FOREIGN PATENT DOCUMENTS

EP      0 821 511 A1      1/1998

(Continued)

OTHER PUBLICATIONS

"Venture IP Telephone System" Aastra (website) 2 pgs. http://www.AASTRA.com/products/callerids/voicecallerid/be-6060.html accessed on Aug. 1, 2005.

(Continued)

*Primary Examiner*—Lester Kincaid
*Assistant Examiner*—Charles Shedrick
(74) *Attorney, Agent, or Firm*—Cantor Colburn LLP

(57) ABSTRACT

Embodiments relate to a method, system, and storage medium for transmitting enhanced originator information over a communications network. The method includes receiving information elements selected by an originator terminal from a database. The information elements retrieved are based upon a service plan and/or a terminal capability associated with a recipient terminal. The method also includes transmitting a communication including the information elements to the recipient terminal prior to establishing a communications session with the recipient terminal. The transmission is conducted over at least one of: an Internet Protocol network, a public switched telephone network, a wireless local area network, a wireless network, a cable network, a fiber optic network, a video network, and a satellite network.

19 Claims, 5 Drawing Sheets

U.S. PATENT DOCUMENTS

| | | |
|---|---|---|
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |
| 4,955,075 A | 9/1990 | Anderson |
| 4,995,075 A | 2/1991 | Angiolillo-Bent |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,423,089 A | 6/1995 | Chun et al. |
| 5,425,076 A | 6/1995 | Knippelmier |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| H1714 H | 3/1998 | Partridge, III |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan |
| 5,802,160 A | 9/1998 | Kugell |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,878,036 A | 3/1999 | Spartz et al. |
| 5,883,942 A | 3/1999 | Lim et al. |
| 5,884,144 A | 3/1999 | Chavez et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,006,087 A | 12/1999 | Amin |

| | | | | | | |
|---|---|---|---|---|---|---|
| 6,009,321 | A | 12/1999 | Wang et al. | 6,317,781 B1 | 11/2001 | De Boor et al. |
| 6,014,559 | A | 1/2000 | Amin | 6,324,263 B1 | 11/2001 | Sherwood et al. |
| 6,016,512 | A | 1/2000 | Huitema | 6,324,271 B1 | 11/2001 | Sawyer et al. |
| 6,021,188 | A | 2/2000 | Meg | 6,327,347 B1 | 12/2001 | Gutzmann |
| 6,021,427 | A | 2/2000 | Spagna et al. | 6,332,021 B2 | 12/2001 | Latter et al. |
| 6,031,899 | A | 2/2000 | Wu | 6,333,973 B1 | 12/2001 | Smith et al. |
| 6,044,148 | A | 3/2000 | Bleile | 6,337,904 B1 | 1/2002 | Gisby |
| 6,049,291 | A | 4/2000 | Kikinis | 6,337,979 B1 | 1/2002 | Nakayasu |
| 6,058,171 | A | 5/2000 | Hoopes | 6,339,639 B1 | 1/2002 | Henderson |
| 6,061,434 | A | 5/2000 | Corbett | 6,341,161 B1 * | 1/2002 | Latter et al. ............ 379/142.01 |
| 6,061,566 | A | 5/2000 | Friman | 6,345,187 B1 | 2/2002 | Berthoud et al. |
| 6,064,876 | A | 5/2000 | Ishida et al. | 6,347,136 B1 | 2/2002 | Horan |
| 6,065,844 | A | 5/2000 | Chen | 6,351,637 B1 | 2/2002 | Lee |
| 6,072,859 | A | 6/2000 | Kong | 6,353,664 B1 | 3/2002 | Cannon et al. |
| 6,078,581 | A | 6/2000 | Shtivelman et al. | 6,361,637 B2 | 3/2002 | Martin et al. |
| 6,091,947 | A | 7/2000 | Sumner | 6,363,140 B1 | 3/2002 | Pinard |
| 6,094,478 | A | 7/2000 | Shepherd et al. | 6,363,411 B1 | 3/2002 | Dugan et al. |
| 6,094,573 | A * | 7/2000 | Heinonen et al. ........ 455/412.1 | 6,363,664 B1 | 4/2002 | Brutsaert |
| 6,094,574 | A | 7/2000 | Vance et al. | 6,366,661 B1 | 4/2002 | Devillier et al. |
| 6,101,246 | A | 8/2000 | Heinmiller et al. | 6,366,772 B1 | 4/2002 | Arnson |
| 6,104,784 | A | 8/2000 | Robbins | 6,377,807 B1 | 4/2002 | Iparrea et al. |
| 6,104,800 | A | 8/2000 | Benson | 6,377,979 B1 | 4/2002 | Yamashita et al. |
| 6,108,630 | A | 8/2000 | Kuechler et al. | 6,389,124 B1 | 5/2002 | Schnarel et al. |
| 6,111,939 | A | 8/2000 | Brabanec | 6,400,809 B1 | 6/2002 | Bossemeyer, Jr. et al. |
| 6,134,235 | A | 10/2000 | Goldman et al. | 6,400,947 B1 | 6/2002 | Bright et al. |
| 6,134,311 | A | 10/2000 | Ekstrom | 6,404,868 B1 | 6/2002 | Beamish et al. |
| 6,137,870 | A | 10/2000 | Scherer | 6,404,875 B2 | 6/2002 | Malik et al. |
| 6,137,871 | A | 10/2000 | Maier et al. | 6,411,692 B1 | 6/2002 | Scherer |
| 6,141,341 | A | 10/2000 | Jones | 6,421,425 B1 | 7/2002 | Bossi et al. |
| 6,141,409 | A | 10/2000 | Madoch et al. | 6,422,263 B1 | 7/2002 | Spicer |
| 6,144,644 | A | 11/2000 | Bajzath et al. | 6,427,003 B1 | 7/2002 | Corbett et al. |
| 6,154,531 | A | 11/2000 | Clapper | 6,427,064 B1 | 7/2002 | Henderson |
| 6,160,876 | A | 12/2000 | Moss et al. | 6,434,394 B1 | 8/2002 | Grundvig et al. |
| 6,161,021 | A | 12/2000 | Akpa | 6,437,879 B1 | 8/2002 | Temple |
| 6,163,595 | A | 12/2000 | Parker et al. | 6,438,216 B1 | 8/2002 | Aktas |
| 6,163,691 | A | 12/2000 | Buettner et al. | 6,438,217 B1 | 8/2002 | Huna |
| 6,167,254 | A | 12/2000 | Chavez, Jr. et al. | 6,438,584 B1 | 8/2002 | Powers |
| 6,169,911 | B1 | 1/2001 | Wagner et al. | 6,442,249 B1 | 8/2002 | Miller, Jr. |
| 6,173,049 | B1 | 1/2001 | Malik | 6,442,262 B1 | 8/2002 | Moss et al. |
| 6,178,232 | B1 | 1/2001 | Latter et al. | 6,442,263 B1 | 8/2002 | Beaton et al. |
| 6,181,928 | B1 | 1/2001 | Moon | 6,442,283 B1 | 8/2002 | Tewfik et al. |
| D437,879 | S | 2/2001 | Weinandt | 6,445,781 B1 | 9/2002 | Heinmiller et al. |
| 6,185,289 | B1 | 2/2001 | Hetz et al. | 6,449,351 B1 | 9/2002 | Moss et al. |
| 6,192,115 | B1 | 2/2001 | Toy et al. | 6,449,361 B1 | 9/2002 | Okuda |
| 6,192,116 | B1 | 2/2001 | Mayak | 6,462,646 B2 | 10/2002 | Helferich |
| 6,198,480 | B1 | 3/2001 | Cotugno et al. | 6,466,653 B1 | 10/2002 | Hamrick et al. |
| 6,198,920 | B1 | 3/2001 | Doviak et al. | 6,480,589 B1 | 11/2002 | Lee et al. |
| 6,202,023 | B1 | 3/2001 | Hancock et al. | 6,483,898 B2 | 11/2002 | Lew et al. |
| 6,219,407 | B1 | 4/2001 | Kanevsky et al. | 6,493,430 B2 | 12/2002 | Leuca et al. |
| 6,222,826 | B1 | 4/2001 | Faynberg et al. | 6,493,431 B1 | 12/2002 | Troen-Krasnow et al. |
| 6,226,367 | B1 | 5/2001 | Smith et al. | 6,493,437 B1 | 12/2002 | Olshansky |
| 6,226,369 | B1 | 5/2001 | Lim et al. | 6,493,439 B2 | 12/2002 | Lung et al. |
| 6,230,006 | B1 | 5/2001 | Keenan et al. | 6,494,953 B2 | 12/2002 | Hayes et al. |
| 6,233,325 | B1 | 5/2001 | Frech et al. | 6,496,569 B2 | 12/2002 | Pelletier et al. |
| 6,236,975 | B1 | 5/2001 | Boe et al. | 6,496,571 B1 | 12/2002 | Wilson |
| 6,243,448 | B1 | 6/2001 | Corbett et al. | 6,496,692 B1 | 12/2002 | Shanahan |
| 6,243,461 | B1 | 6/2001 | Hwang | 6,498,841 B2 | 12/2002 | Bull et al. |
| 6,252,952 | B1 | 6/2001 | Kung et al. | 6,507,737 B1 | 1/2003 | Laham et al. |
| 6,256,671 | B1 | 7/2001 | Strentzsch et al. | 6,529,500 B1 | 3/2003 | Pandharipande |
| 6,262,987 | B1 | 7/2001 | Mogul | 6,529,591 B1 | 3/2003 | Dosani et al. |
| 6,266,399 | B1 | 7/2001 | Weller et al. | 6,532,490 B1 | 3/2003 | Lewis et al. |
| 6,278,704 | B1 | 8/2001 | Creamer et al. | 6,539,080 B1 | 3/2003 | Bruce et al. |
| 6,278,862 | B1 | 8/2001 | Henderson | 6,542,583 B1 | 4/2003 | Taylor |
| 6,282,275 | B1 | 8/2001 | Gurbani et al. | 6,542,586 B1 | 4/2003 | Helstab |
| 6,292,479 | B1 | 9/2001 | Bartholomew et al. | 6,542,591 B1 | 4/2003 | Amro et al. |
| 6,292,549 | B1 | 9/2001 | Lung et al. | 6,542,602 B1 | 4/2003 | Elazar |
| 6,295,502 | B1 | 9/2001 | Hancock et al. | 6,542,812 B1 | 4/2003 | Obradovich et al. |
| 6,301,342 | B1 | 10/2001 | Ander et al. | 6,546,092 B2 | 4/2003 | Corbett et al. |
| 6,301,350 | B1 | 10/2001 | Henningson et al. | 6,549,621 B1 | 4/2003 | Christie, IV et al. |
| 6,304,644 | B2 | 10/2001 | Karnowski | 6,553,110 B1 | 4/2003 | Peng |
| 6,310,943 | B1 | 10/2001 | Kowalski | 6,553,221 B2 | 4/2003 | Nakamura et al. |
| 6,311,057 | B1 | 10/2001 | Barvesten | 6,556,540 B1 | 4/2003 | Mawhinney et al. |
| 6,317,488 | B1 | 11/2001 | DePond et al. | 6,560,317 B1 | 5/2003 | Quagliana |

| Patent No. | Date | Name |
|---|---|---|
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B1 | 5/2003 | Gerszberg et al. |
| 6,574,319 B2 | 6/2003 | Latter et al. |
| 6,584,490 B1 | 6/2003 | Schuster et al. |
| 6,587,458 B1 | 7/2003 | Burg et al. |
| 6,590,970 B1 | 7/2003 | Cai et al. |
| 6,597,905 B1 | 7/2003 | Hijii |
| 6,603,840 B2 | 8/2003 | Fellingham et al. |
| 6,603,854 B1 | 8/2003 | Judkins et al. |
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,378 B1 | 12/2003 | Spielman et al. |
| 6,665,388 B2 | 12/2003 | Bedingfield |
| 6,665,715 B1 | 12/2003 | Houri |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,714,519 B2 | 3/2004 | Luzzatti et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,738,615 B1 | 5/2004 | Chow et al. |
| 6,748,058 B1 | 6/2004 | Schwend et al. |
| 6,748,068 B1 | 6/2004 | Walsh et al. |
| 6,751,457 B1 | 6/2004 | Martin |
| 6,757,274 B1 | 6/2004 | Bedingfield et al. |
| 6,757,732 B1 | 6/2004 | Sollee et al. |
| 6,757,740 B1 | 6/2004 | Parekh et al. |
| 6,760,413 B2 | 7/2004 | Cannon et al. |
| 6,765,998 B2 | 7/2004 | Bruce et al. |
| 6,766,003 B2 | 7/2004 | Moss et al. |
| 6,768,792 B2 | 7/2004 | Brown et al. |
| D494,953 S | 8/2004 | Leung |
| 6,771,754 B2 | 8/2004 | Pelletier et al. |
| 6,771,755 B1 | 8/2004 | Simpson |
| 6,771,956 B1 | 8/2004 | Beeler |
| 6,775,366 B1 | 8/2004 | Cobbett et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,876 B1 | 9/2004 | Bala |
| 6,798,879 B1 | 9/2004 | Beham |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,271 B1 | 11/2004 | Kanabar et al. |
| 6,826,617 B1 | 11/2004 | Ansell et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,865,384 B2 | 3/2005 | Sagi et al. |
| 6,868,155 B1 | 3/2005 | Cannon et al. |
| 6,870,924 B1 | 3/2005 | Ukon |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,947,531 B1 | 9/2005 | Lewis et al. |
| 6,952,469 B2 | 10/2005 | Han |
| 6,977,993 B2 | 12/2005 | Starbuck et al. |
| 6,996,211 B2 | 2/2006 | Reynolds et al. |
| 7,006,613 B2 * | 2/2006 | Novak et al. ............ 379/142.01 |
| 7,016,482 B2 | 3/2006 | Moss et al. |
| 7,027,408 B2 | 4/2006 | Nabkel et al. |
| 7,027,569 B2 | 4/2006 | Price |
| 7,085,358 B2 | 8/2006 | Ruckart et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,184,533 B1 | 2/2007 | Shaffer et al. |
| 7,228,129 B1 | 6/2007 | Ward et al. |
| 7,313,227 B2 | 12/2007 | Jones |
| 2001/0002209 A1 | 5/2001 | Han |
| 2001/0005854 A1 | 6/2001 | Murata et al. |
| 2001/0036174 A1 | 11/2001 | Herring |
| 2001/0044898 A1 | 11/2001 | Benussi et al. |
| 2001/0048737 A1 | 12/2001 | Goldberg et al. |
| 2002/0004382 A1 | 1/2002 | Cox et al. |
| 2002/0007400 A1 | 1/2002 | Pedersen |
| 2002/0009184 A1 | 1/2002 | Shnier |
| 2002/0016748 A1 | 2/2002 | Emodi et al. |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077083 A1 * | 6/2002 | Zellner et al. ................ 455/414 |
| 2002/0077084 A1 * | 6/2002 | Zellner et al. ................ 455/414 |
| 2002/0077102 A1 | 6/2002 | Achuthan et al. |
| 2002/0077118 A1 * | 6/2002 | Zellner et al. ................ 455/456 |
| 2002/0077897 A1 * | 6/2002 | Zellner et al. .................. 705/14 |
| 2002/0082050 A1 | 6/2002 | Mountney et al. |
| 2002/0085687 A1 | 7/2002 | Contractor |
| 2002/0090933 A1 | 7/2002 | Rouse et al. |
| 2002/0091777 A1 | 7/2002 | Schwartz |
| 2002/0094826 A1 | 7/2002 | Lee |
| 2002/0118812 A1 | 8/2002 | Contractor |
| 2002/0119430 A1 | 8/2002 | Szynalski |
| 2002/0120629 A1 | 8/2002 | Leonard |
| 2002/0125929 A1 | 9/2002 | Chen et al. |
| 2002/0128033 A1 | 9/2002 | Burgess |
| 2002/0172338 A1 * | 11/2002 | Lee et al. ................ 379/142.01 |
| 2002/0183098 A1 | 12/2002 | Lee et al. |
| 2002/0188443 A1 | 12/2002 | Reddy et al. |
| 2002/0191755 A1 | 12/2002 | Lew et al. |
| 2002/0196913 A1 | 12/2002 | Ruckart |
| 2002/0196914 A1 | 12/2002 | Ruckart |
| 2002/0197991 A1 | 12/2002 | Anvekar et al. |
| 2003/0002633 A1 | 1/2003 | Kredo et al. |
| 2003/0007620 A1 | 1/2003 | Elsey et al. |

| | | | |
|---|---|---|---|
| 2003/0012353 A1 | 1/2003 | Tang et al. | |
| 2003/0016143 A1 | 1/2003 | Ghazarian | |
| 2003/0016800 A1 | 1/2003 | Fukuda | |
| 2003/0021290 A1 | 1/2003 | Jones | |
| 2003/0022659 A1* | 1/2003 | Mun et al. | 455/415 |
| 2003/0026413 A1 | 2/2003 | Brandt et al. | |
| 2003/0026416 A1 | 2/2003 | Fusco | |
| 2003/0032414 A1 | 2/2003 | Melaku et al. | |
| 2003/0050100 A1 | 3/2003 | Dent | |
| 2003/0053602 A1 | 3/2003 | Stuckman et al. | |
| 2003/0063730 A1 | 4/2003 | Woodring | |
| 2003/0063731 A1 | 4/2003 | Woodring | |
| 2003/0068020 A1 | 4/2003 | Hamrick et al. | |
| 2003/0092384 A1 | 5/2003 | Ross, III | |
| 2003/0092432 A1* | 5/2003 | Hwang | 455/415 |
| 2003/0095650 A1 | 5/2003 | Mize | |
| 2003/0108184 A1 | 6/2003 | Brown et al. | |
| 2003/0112938 A1 | 6/2003 | Kanakubo et al. | |
| 2003/0119503 A1 | 6/2003 | Shohara et al. | |
| 2003/0119522 A1 | 6/2003 | Barclay et al. | |
| 2003/0133553 A1 | 7/2003 | Khakoo | |
| 2003/0135562 A1 | 7/2003 | Himmel et al. | |
| 2003/0135626 A1 | 7/2003 | Ray et al. | |
| 2003/0148758 A1 | 8/2003 | McMullin | |
| 2003/0152207 A1 | 8/2003 | Ryan | |
| 2003/0187949 A1 | 10/2003 | Bhatt et al. | |
| 2003/0193967 A1 | 10/2003 | Fenton et al. | |
| 2003/0196206 A1 | 10/2003 | Shusman | |
| 2003/0198322 A1 | 10/2003 | White, Jr. | |
| 2003/0215078 A1 | 11/2003 | Brahm et al. | |
| 2003/0219107 A1 | 11/2003 | Richardson et al. | |
| 2004/0049545 A1 | 3/2004 | Lockridge et al. | |
| 2004/0066928 A1 | 4/2004 | Leijonhufvud | |
| 2004/0097243 A1* | 5/2004 | Zellner et al. | 455/456.1 |
| 2004/0101118 A1 | 5/2004 | Powell | |
| 2004/0101124 A1 | 5/2004 | Koch et al. | |
| 2004/0109558 A1 | 6/2004 | Koch | |
| 2004/0114730 A1 | 6/2004 | Koch et al. | |
| 2004/0120478 A1 | 6/2004 | Reynolds et al. | |
| 2004/0122918 A1* | 6/2004 | Fredlund et al. | 709/219 |
| 2004/0125929 A1 | 7/2004 | Pope | |
| 2004/0168121 A1* | 8/2004 | Matz | 715/513 |
| 2004/0171370 A1 | 9/2004 | Natarajan | |
| 2004/0181587 A1 | 9/2004 | Cao et al. | |
| 2004/0192332 A1 | 9/2004 | Samn | |
| 2004/0202298 A1 | 10/2004 | Lopez et al. | |
| 2004/0202299 A1 | 10/2004 | Schwartz | |
| 2004/0208301 A1 | 10/2004 | Urban | |
| 2004/0208302 A1 | 10/2004 | Urban et al. | |
| 2004/0209604 A1 | 10/2004 | Urban et al. | |
| 2004/0209605 A1* | 10/2004 | Urban et al. | 455/415 |
| 2004/0209640 A1 | 10/2004 | Urban et al. | |
| 2004/0213207 A1 | 10/2004 | Silver et al. | |
| 2004/0233892 A1 | 11/2004 | Roberts | |
| 2004/0242212 A1 | 12/2004 | Bacon | |
| 2004/0248560 A1 | 12/2004 | Bedingfield et al. | |
| 2004/0255321 A1* | 12/2004 | Matz | 725/14 |
| 2004/0261096 A1* | 12/2004 | Matz | 725/28 |
| 2005/0033849 A1* | 2/2005 | Matz | 709/228 |
| 2005/0073999 A1* | 4/2005 | Koch | 370/352 |
| 2005/0084084 A1 | 4/2005 | Cook et al. | |
| 2005/0100158 A1 | 5/2005 | Kreiner et al. | |
| 2005/0107074 A1 | 5/2005 | Zellner | |
| 2005/0147228 A1 | 7/2005 | Perrella et al. | |
| 2005/0152525 A1 | 7/2005 | Kent | |
| 2006/0002540 A1 | 1/2006 | Kreiner et al. | |
| 2006/0013375 A1 | 1/2006 | Smith et al. | |
| 2006/0029209 A1 | 2/2006 | Moton et al. | |
| 2006/0153173 A1 | 7/2006 | Beck et al. | |

FOREIGN PATENT DOCUMENTS

| | | |
|---|---|---|
| KR | 2002-0014945 | 2/2002 |
| WO | 97/50225 | 12/1997 |
| WO | WO 97/50225 | 12/1997 |
| WO | WO 03/030501 A1 | 4/2003 |
| WO | WO 03/030502 A1 | 4/2003 |
| WO | WO03090432 | 10/2003 |

OTHER PUBLICATIONS

"Venture IP Telephone System" AASTRA (website) 2 pgs. http://www.aastra.com/products/callerids/voicecallerid/be-6090.html accessed on Aug. 1, 2005.

"Venture IP Telephone System" AASTRA (website) 2 pgs. http://www.aastra.com/products/callerids/voicecallerid/be-9090.html accessed on Aug. 1, 2005.

SmartHome "The Caller ID System that Speaks for Itself!" (website) 3 pgs. http://www.smarthome.com/5154.html accessed on Aug. 19, 2006.

AASTRA Telecom "Voice-6090 Talking Caller ID" (website) 2 pgs. http://aastra.com/products/callerids/voicecallerid/be-6090.html accessed on Nov. 5, 2001.

AASTRA Telecom, Press Release, AASTRA Telecom Introduces CNX Conference Bridge, Aug. 29, 2005, 1 page.

International Search Report PCT/US02/30068, Dec. 9, 2002.

International Search Report PCT/US02/29988, Sep. 23, 2002.

"RBS 884 Pick System Description", Author Unknown, Ericsson 1/1551-AE/LZB 119 2269 Uae Rev A, Apr. 23, 1998.

Slawson, "Called ID Basics" Caller ID, http://www.testmark.com/develop/tml_callerid_cnt.html, Oct. 22, 2003.

"SIP, Session Initiation Protocol", Handley et al., Mar. 1999*.

"The IP Network Address Translator (NAT)" Egevang et al., May 1994*.

Bellcore Specification TR-NWT-000031, Calling Number Delivery, Issue 4, Dec. 1992.

Bellcore Specification TR-NWT-001188, Calling Name Delivery Generic Requirements, Issue 1, Dec. 1991.

Mark H. Norris, Transmitter Architectures, 1998, IEEE, pp. 4/1-4/6*.

J. Boswell, G. Lingenauber, An Advanced HF Receiver Design, Jul. 1994, IEEE, Conference Publication. No. 392, pp. 41-47*.

U.S. Appl. No. 10/174,026, filed Jun. 18, 2002, entitled "Method for Using AIN to Deliver Called ID to Alpha-Numeric Pagers as well as Other Wireless Devices", for Calls Delivered to Wireless Networks, Inventor, James C. Bedinfield, Sr., et al.

U.S. Appl. No. 10/144,555, filed May 13, 2002, entitled "Third Party Content for Internet Called-ID Messages", Inventor, Koch, et al.

U.S. Appl. No. 10/200,874, filed Jul. 23, 2002, entitled "System and Method for Gathering Information Related to a Geographic Location".

U.S. Appl. No. 10/201,042, filed Jul. 23, 2002, entitled "System and Method for Gathering Information Related to a Geographical Location of a-Callee in a Public Switched Telephone Network".

U.S. Appl. No. 09/812,338, filed Mar. 19, 2001, entitled "Switch Communications Interface Unit for Telecommunications", inventor, Clayton M. Smith.

U.S. Appl. No. 10/144,556, filed May 13, 2002, entitled "Internet Called-ID Integration", inventor, Koch et al.

U.S. Appl. No. 10/152,544, filed May 21, 2002, entitled "Telecommunications Device Ring Tone Apparatuses, Systems and Methods", inventor, Alston et al.

U.S. Appl. No. 09/992,165, filed Nov. 6, 2001, entitled "Caller Identification Queue for Wireless Telephones".

U.S. Appl. No. 10/891,883, filed Jul. 15, 2004, entitled "Methods of Providing Caller Identification Information and Related Registries and Radiotelephone Networks", inventor, Smith et al.

U.S. Appl. No. 10/200,906, filed Jul. 23, 2002, entitled "System and Method for Gathering Information Related to a Geographical Location of a Caller in a Public Switched Telephone Network".

U.S. Appl. No. 10/201,706, filed Jul. 23, 2002, entitled "System and Method for Gathering Information Related to a Geographical Location of a Caller in an Internet-Based Communication System".

Farley et al., "Cellular Telephone Basics: AMPS and Beyond", TelecomWriting.com, Mar. 6, 2003, pp. 1-8.

Time Division Multiple Access (TDMA):, International Engineering Consortium, Author Unknown, Mar. 6, 2003, pp. 1-2.

Talking Caller ID, Smarthome, http://www.smarthome.com/5154.html, pp. 1-3, Nov. 5, 2001.

OKI Silicon Solutions Company, Japan Site, "Multi-Lingual Text-to-Speech Processor ML2110", http:www.//oki.com/semi/English/m12110/htm, pp. 1-6, Nov. 1, 2001.

Voice-6090 "Talking Caller ID", Aastra Telecom-Talking Caller ID-Voices 9090, http://www.aastra.com/products/callerids/voicecallerid/be-6090.html, pp. 1-2, Nov. 5, 2001.

Voice-9090 "Talking Called ID", Aastra Telecom-Talking Caller ID-Voice 9090, http://ww/www.aastra.com/products/callerids/voicecallerid/be-9090.html, pp. 1-2, Nov. 5, 2001.

Talking Caller Id, Stealth Software, http://www.talkingcallerid.com/, TalkingCaller ID-Featuring Talking, Paging, Email, Voice Mail, Blocking, Text-to-speech, pp. 1-4, Nov. 5, 2001.

"Address Allocation for Private Internets", Rekhter et al., pp. 1-8, Feb. 1996.

U.S. Appl. No. 10/032,724, filed Dec. 27, 2001, entitled "Voice Caller ID", Inventor, Robert T. Moton et al.

U.S. Appl. No. 10/884,504, filed Jul. 2, 2004, entitled "Real-Time Customer Service Representative Workload Management", Inventor, Barrett Kreiner et al.

* cited by examiner

METHOD, SYSTEM, AND STORAGE MEDIUM FOR PROVIDING COMPREHENSIVE ORIGINATOR IDENTIFICATION SERVICES

BACKGROUND OF THE INVENTION

Embodiments of the invention relate generally to telecommunications, and more particularly, to a method, system, and storage medium for providing comprehensive originator identification services over a communications network.

The development of caller identification services has had a significant impact on the ability for called parties to more effectively manage their communications. In emergency situations, existing caller identification services provide a way for an emergency center to identify the location and the identity of the calling party and for calling the party back should the two parties become disconnected. Many consumers use caller identification to screen incoming calls from parties they do not wish to talk to. Conversely, call blocking services allow callers to keep their identities and/or telephone numbers private in cases where they do not wish the receiving party to have this information. Other forms of communication, such as email, provide some level of identification information regarding the originator before the recipient opens the message (e.g., originator, subject matter). These solutions, while beneficial, do not take full advantage of what is now possible with existing technology.

What is needed, therefore, is a way to extend existing capabilities and functionality for caller identification services by providing detailed information about an incoming communication before the communication session has been established.

SUMMARY OF THE INVENTION

Embodiments relate to a method, system, and storage medium for transmitting enhanced originator information over a communications network. The method includes receiving information elements selected by an originator terminal from a database. The information elements retrieved are based upon a service plan and/or a terminal capability associated with a recipient terminal. The method also includes transmitting a communication including the information elements to the recipient terminal prior to establishing a communications session with the recipient terminal. The transmission is conducted over at least one of: an Internet Protocol network, a public switched telephone network, a wireless local area network, a wireless network, a cable network, a fiber optic network, a video network, and a satellite network.

Embodiments further include a system for providing comprehensive originator identification services over a communications network. The system includes a caller identification-enabled recipient terminal operating over a communications network via a service provider, an originator terminal operating over a communications network via a service provider, and an originator communications information database. The system also includes an originator identification system executing over the communications network. The originator identification system receives information elements selected by an originator terminal from a database based upon at least one of a service plan and a terminal capability associated with a recipient terminal. The originator identification system also transmits a communication including the information elements to the recipient terminal prior to establishing a communications session with the recipient terminal. The transmission is conducted over at least one of: an Internet Protocol network, a public switched telephone network, a wireless local area network, a wireless network, a cable network, a fiber optic network, a video network, and a satellite network.

Embodiments also include a terminal device for transmitting enhanced originator information over a communications network. The terminal device is enabled with caller identification. The terminal device includes an originator identification system in communication with the terminal device. The terminal device operates over a communications network via a service provider. The terminal device is linked to an originator communications information database. The terminal device receives information associated with an originator of a communication. The information includes information elements comprising at least one of: font and character style capabilities, a logo, an image, audio, multi-media, animation, VPIM, a uniform resource locator, a physical location address, video, an alerting tone, and advertising material.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

The originator identification system of the invention is a flexible and comprehensive communications identification service that provides a variety of information about a communication to its recipient prior to the recipient establishing a communications session. The originator identification system is capable of being implemented over varying communications networks and for a variety of types of communications devices and technologies. The originator identification system of the invention refers to a system that provides comprehensive information about a calling party to a recipient party via any communications means and is not to be confused with caller identification devices/services commonly known in the art which provide limited caller information such as a phone number or name or systems that use this information to retrieve additional information from locally or centralized databases associated with the individual's address book or a company's customer list.

Figure 1:
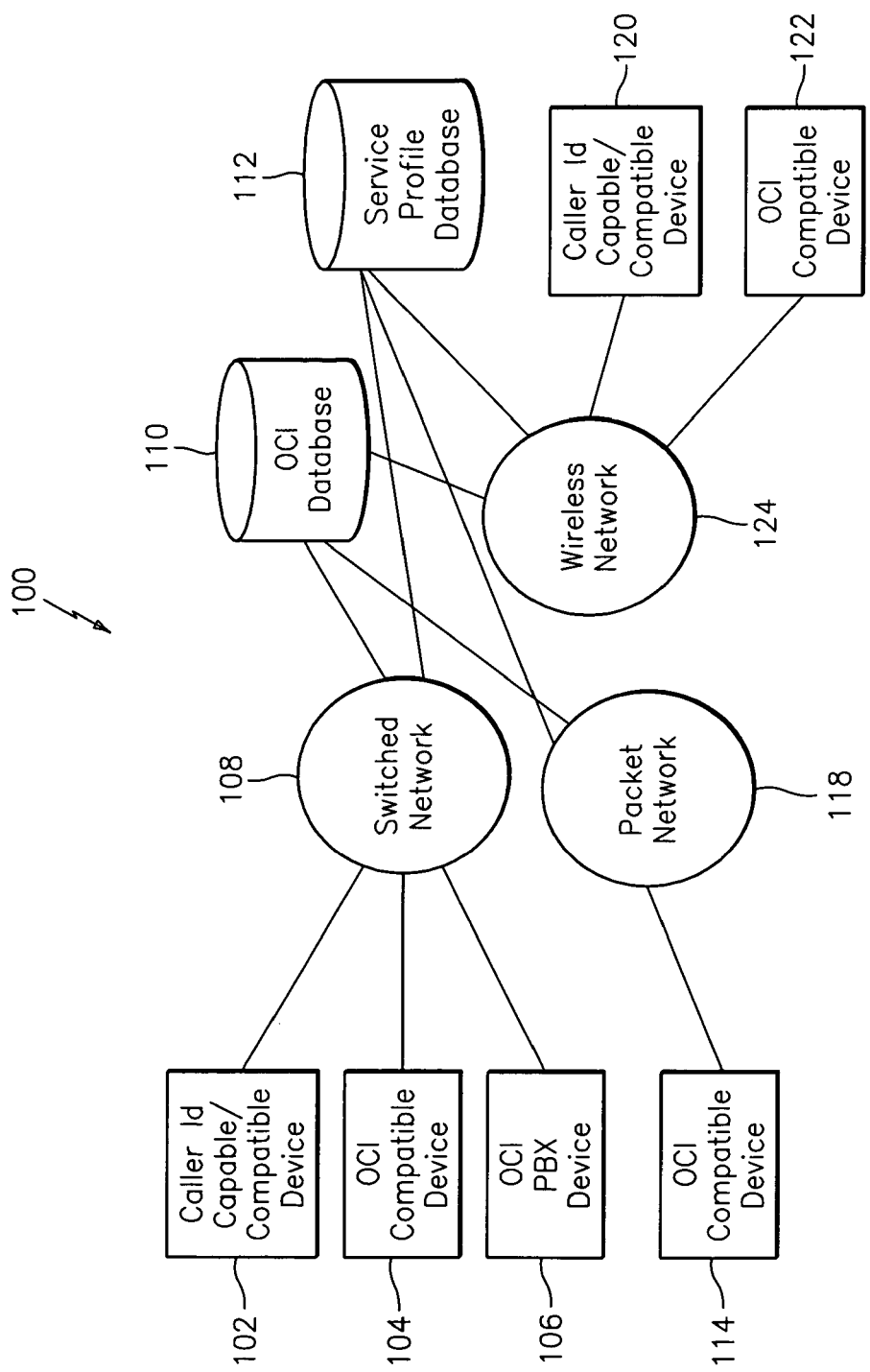
FIG. 1 is a block diagram of a system upon which the originator identification system is implemented in exemplary embodiments of the invention.

The originator identification system is executed via one or more communications networks as shown in system 100 of FIG. 1. FIG. 1 depicts communications devices 102-106 in communication with circuit-switched network 108. Circuit-switched network 108 represents a standard public switched telephone network (PSTN).

Also included in system 100 is communications device 114 in communication with packet-switched network 118. Packet-switched network 118 may be local area network, wide area network, metropolitan area network, Internet network, or other similar type of network environment.

Additionally, communications devices 120 and 122 are in communication with wireless network 124. Wireless network 124 may be a cellular communications network, a fixed wireless network, a wireless local area network, a personal area network (PAN) or other suitable network system and includes equipment for receiving and transmitting signals such as a cell tower and mobile switching center.

Networks 108, 118, and 124 are, in turn, in communication with Originator Communications Information (OCI) database 110 and service profile database 112.

OCI database 110 stores information elements for use in creating, transmitting, and displaying communications information in a caller identification environment. Information elements may include font and character style capabilities such as Times New Roman font set at 12 characters per inch (cpi) that is presentable in bold, italic, and/or underlined form. Information elements may also include logos, images, audio, multi-media, animation, VPIM, uniform resource locators, physical location addresses, video, alerting tones, and advertising material. These information elements may be created and provided by an originating calling device and/or a calling network such as network 108, 118, and 124. OCI information is provided to a recipient prior to the opening or establishment of a communications session.

Service profile database 112 stores information relating to the communications devices and service plans associated with users of the originator identification system. The capabilities and limitations of the communications device are stored in service profile database 112. Further, various packages and options may be established for users such as a standard plan that provides a subset of the possible features of the invention or a premium package that is more inclusive.

OCI database 110 communicates with service profile database 112 for determining what information elements may be accommodated for a communications device. OCI database 110 provides a dual-structured data store for servicing both traditional caller identification enabled devices such as device 102, as well as newer or next generation communications devices such as device 104, which provides advanced capabilities. For example, where a telephone is graphically enabled (e.g., VoIP or cellular), the caller identification element may be leveraged to incorporate a compression algorithm enabling it to hold the additional information elements provided by the OCI database 110. The service profile database 112 would indicate the functionality of the enhanced telephone and the appropriate record data would be accessed from OCI database 110. Another example is a traditional caller identification feature enabled on a telephone with a simple monochrome display that does not support graphics (i.e., only ASCII). The service profile database 112 record for this device would communicate this capability to OCI database 110 which, in turn, would send only the traditional simple binary caller identification information. In this manner, the database provides both standard and the OCI information elements.

Communications device 102 refers to a caller identification-enabled telephone that utilizes a Public Switched Telephone Network (PSTN) carrying analog voice data. Communications device 102 supports traditional caller identification capabilities in accordance with Signaling System 7 (SS7) technology and the Automatic Number Identification (ANI) method used to identify billing accounts. SS7 refers to a telecommunications protocol developed by the International Telecommunications Union (ITU) and is well known in the art.

Communications device 104 refers to a communications device that supports the originator identification system services of the invention. Communications device 104 is enabled to receive traditional caller identification services along with enhanced features, such as graphics. For example, communications device 104 may be a next generation telephone device with processor, memory, screen and logic to display text and graphic including images on display of the user device.

Communications device 106 refers to a telephone that is part of a private communications network (i.e., private branch exchange (PBX), softswitch) for an enterprise. A telephone user shares one or more phone numbers with other telephones within the exchange. Communications device 106 supports the features of the originator identification system, as described above with respect to device 104, through the PBX network.

Communications device 114 refers to a device that communicates through a packet-switched network. For example, communications device 114 may be a personal computer that executes email software and subscribes to an email service. Additionally, the personal computer includes an operating system with a graphics component and a display device for presenting communications. In alternative embodiments, communications device 114 may be an Internet-enabled appliance, such as a television or microwave oven that supports the features of the originator identification system. In the personal computer example above, the communication identification system of the invention services communications device 114 by providing comprehensive information about an incoming email to a recipient via email software executing therein.

Communications device 120 refers to a caller identification-enabled communications device that sends communications over a wireless network. Communications device 120 may be a wireless mobile telephone that communicates via a cell tower and mobile switching center, which, in turn, communicates to other networks via a central office.

Communications device 122 refers to a caller identification-enabled communications device that includes graphics capabilities that support the features of the originator identification system of the invention. Communications device 122 may be a mobile computing device or personal digital assistant (PDA) with networking capability such as a web browser and an Internet Service Provider subscription for allowing the PDA to communicate digitally with other communications devices.

The telecommunications infrastructure required for enabling communications devices 102-106, 114, 120 and 122 are well known and will be understood by those skilled in the art. The originator identification system may provide options to users of communications devices such as the ability to block some information elements and screening and transmission control of information elements. For example, a user may block or screen information elements such as pornographic materials, all video materials, or other criteria-based measures. A recipient may prevent any calls in which a caller has blocked information elements or may forward any calls containing video elements to a cell phone. Alternative embodiments include sending only text caller information (for text only devices), sending information using traditional text caller information with supplemental enhanced originator information using transparent signaling. Other embodiments include utilizing XHTML protocol to communicate OCI data to a receiving terminal. Where transmission bandwidth is limited the OCI data is compressed before transmission. The transport layer protocol may include SMDF, ADSI, TCP/IP, and WAP protocols (i.e., WSP, WTP, WDP, and WCMP). These and other services may be implemented using the originator identification system.

The functionality of the originator identification system may also be extended to telephony applications such as call receipt, call waiting, and call forwarding. It may also be extended to applications such as email, unified messaging, facsimile, video conferencing, audio conferencing, call center applications utilizing caller information to retrieve information or update databases, sending originator information through a communications channel not associated with the recipient of the message content (e.g., originator identification through instant messaging or a web browser), and sharing OCI information between devices, among others.

The originator identification system is implemented over one or more of networks 108, 118, and 124 as described in FIGS. 2-5. The originator identification system can be implemented in a variety of communications environments including, for example, a data network such as the Internet, a voice communications network, and may include various types of networks including wireless, asynchronous transfer mode (ATM) network, and Multiprotocol Label Switching (MPLS).

Figure 2:
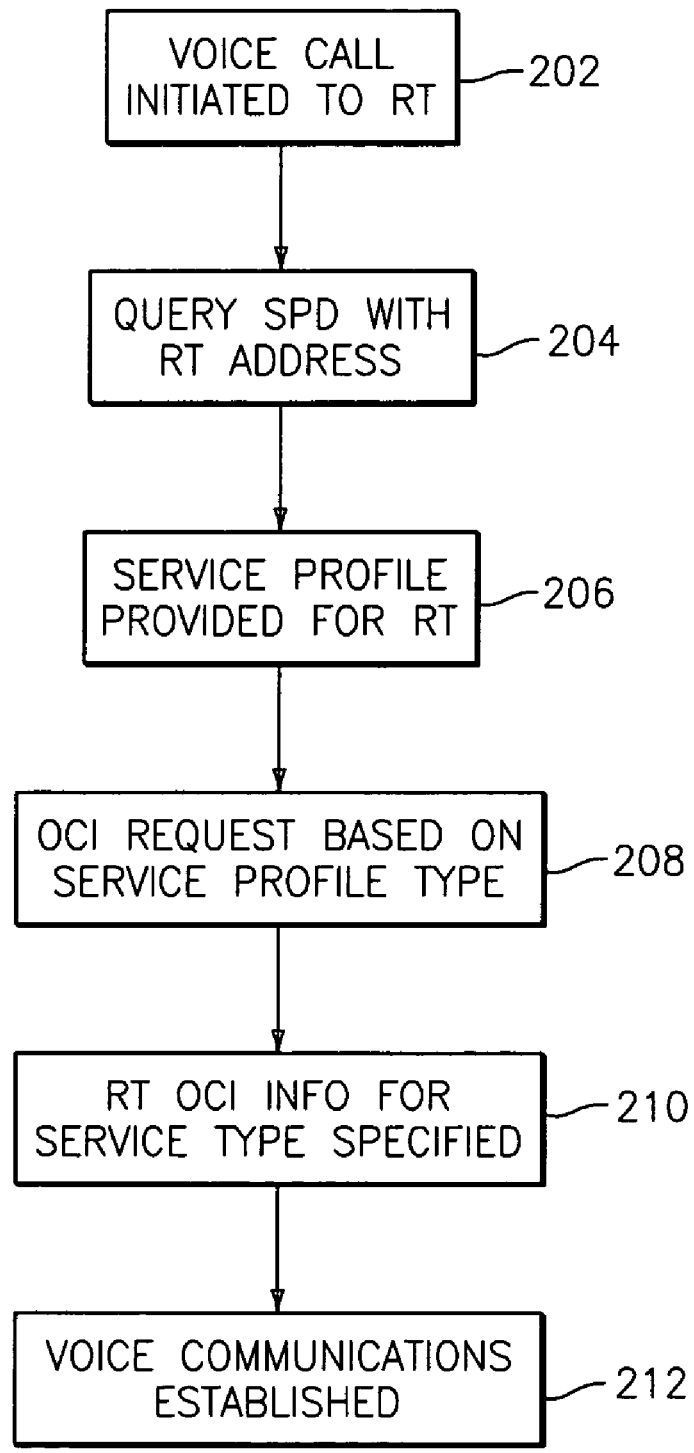
FIG. 2 is a flowchart describing the process of implementing the originator identification system over a circuit switched communications network in exemplary embodiments of the invention.
Figure 3:
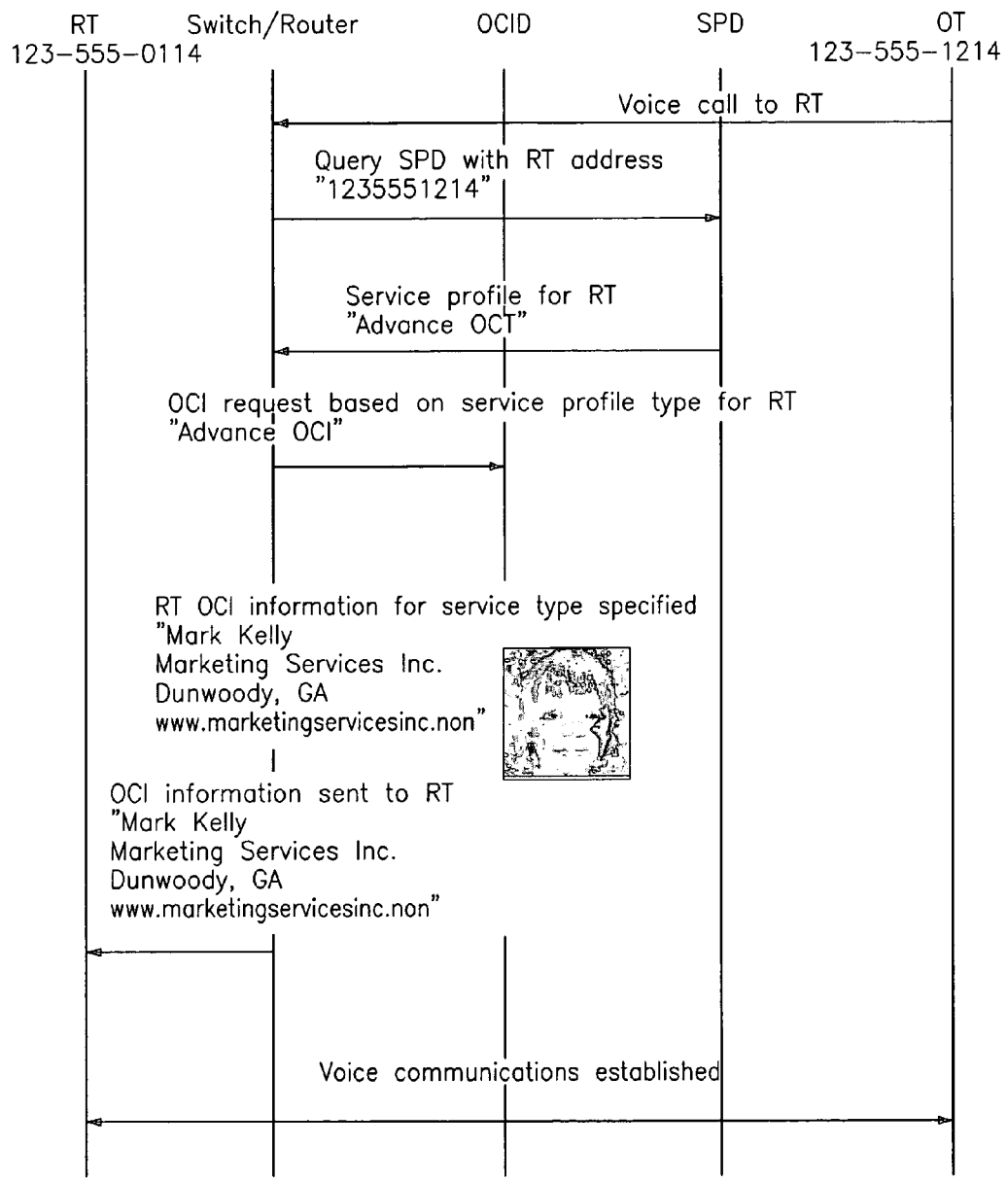
FIG. 3 is a graphical representation of the originator identification system process described in FIG. 2 in exemplary embodiments of the invention.

Turning now to FIG. 2, implementation of the originator identification system over a PSTN network will now be described. A voice call is initiated at step 202 in which an originating terminal places a call to a recipient terminal. The graph in FIG. 3 provides sample data that may be associated with the call. For example, FIG. 3 displays a phone number, 123-555-1214, associated with an originating terminal (OT) number and an arrow indicating the transmission of the call to a switch or router on the network. The originator identification system executing on the network queries service profile database 112 at step 204 to determine the service type and/or device type that is associated with the recipient terminal. For example, the originator identification system needs to know what technological and/or service type capabilities are associated with the recipient terminal. It may be that the recipient terminal does not support caller identification or that the recipient terminal supports caller identification but only in the traditional ASCII format. It may also be that the respective network provides service plan options or packages that a recipient terminal user needs to subscribe to in order to benefit from the services offered by the originator identification system. These and other types of information may be provided in service profile database 112.

The respective service profile for the recipient terminal is retrieved and provided to the network that initiated the query at step 206. At step 208, an OCI request is transmitted to OCI database 110 based upon the service profile associated with the recipient terminal. As indicated above, the OCI information may include graphics such as logos or icons, varying font and color elements, images, sound, video, and any multimedia information supported by the recipient and originator terminals and their networks. The OCI information requested from OCI database 110 is retrieved and sent to the recipient terminal at step 210. The call is forwarded to the recipient terminal at step 212. As shown in FIG. 3, the sample OCI information transmitted to the recipient terminal includes the originating party's name, company name, address, and web site address.

Figure 4:
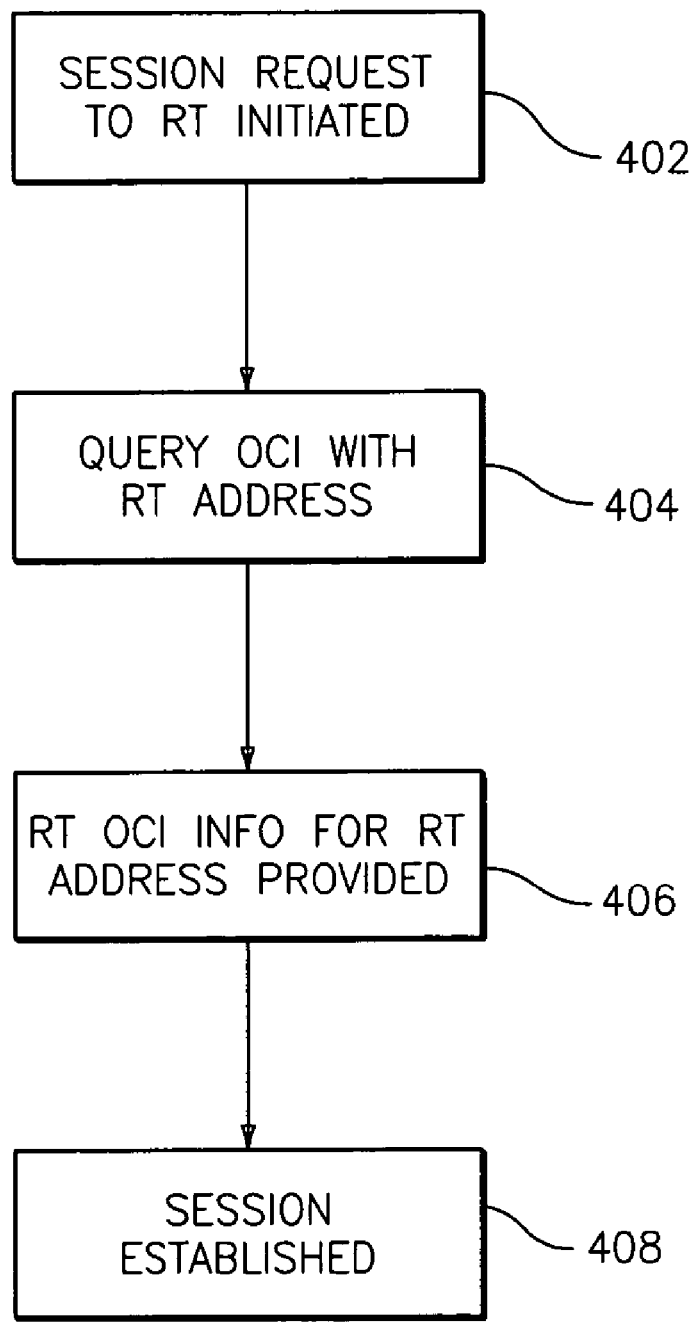
FIG. 4 is a flowchart describing the process of implementing the originator identification system over a packet-switched, peer-to-peer communications network in exemplary embodiments of the invention.
Figure 5:
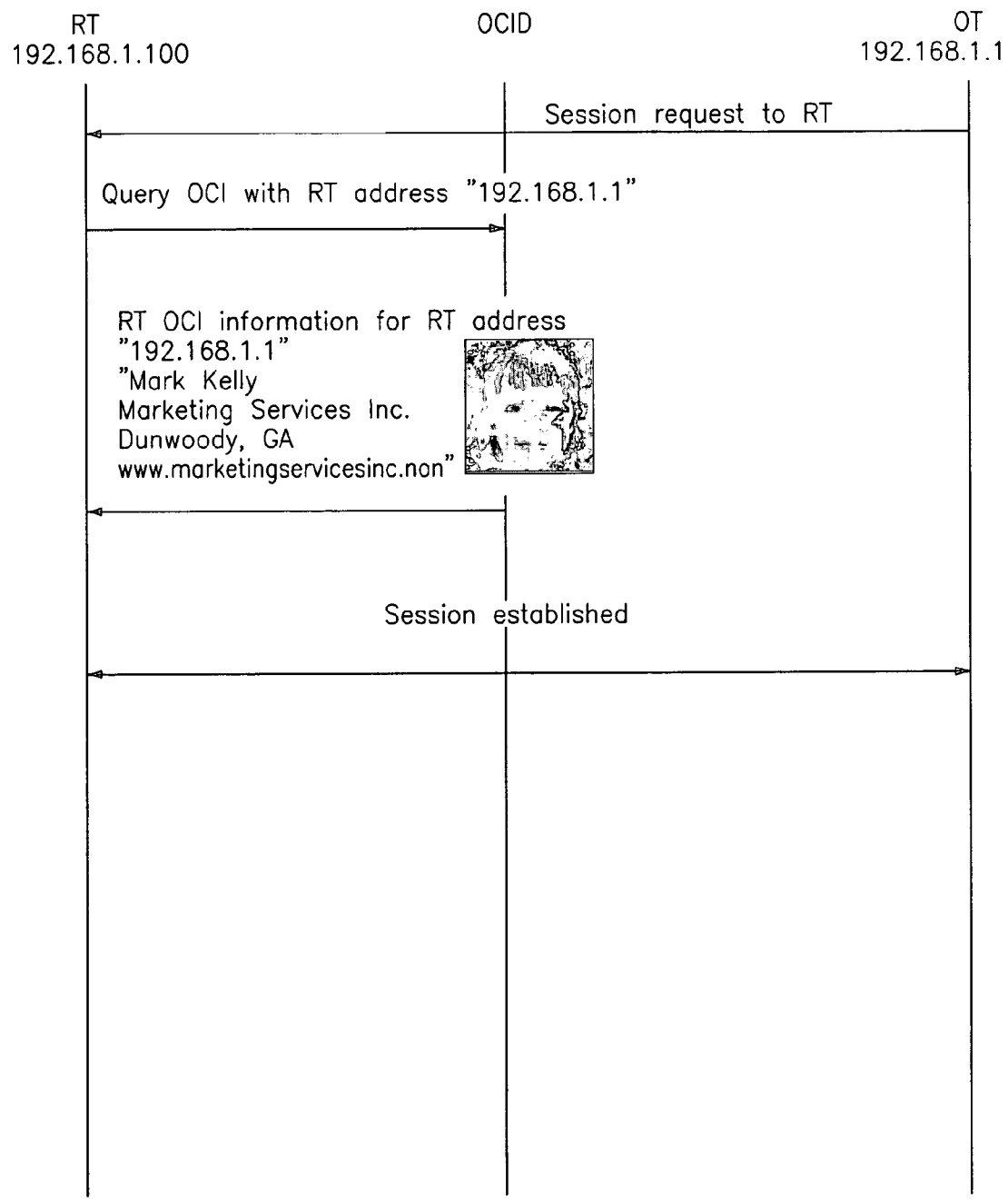
FIG. 5 is a graphical representation of the originator identification system process described in FIG. 4 in exemplary embodiments of the invention.

As indicated above, the originator identification system may be implemented over various types of communications networks. FIG. 4 describes the process of implementing the originator identification system over a peer-to-peer network. Additionally, a graphical representation of the process flow described in FIG. 4 is shown in FIG. 5. A session request is initiated by an originating terminal at step 402. The originating terminal address as shown in FIG. 5 is "192.168.1.1." The session request is transmitted to the recipient terminal using the address provided in the session request, and in the example data shown in FIG. 5 is "192.168.1.100." The recipient terminal accesses the originator identification system, which in turn, queries OCI database 110 for OCI information associated with the originating terminal at step 404. It will be understood that the service profile database 112 need not be accessed in this instance, as the originating and recipient terminals are both computer devices as evidenced by the routing addresses. In this manner, the communications transmissions are processed in accordance with traditional digital networking protocols. The OCI information is retrieved and forwarded to the recipient terminal at step 406. The sample OCI data that may be transmitted are reflected in FIG. 5 and include the originating party's name, company, address, web site address, and logo. The communication session is established at step 408 in which the recipient terminal user views the originator's information without opening the communication itself.

As indicated above, the originator identification system is a comprehensive communications service that provides a variety of information to communications recipients prior to opening or establishing a communications session with the sender of the communication. This allows recipients to better manage their communications by enabling them to make more informed decisions about the screening, routing, organizing, if or when to open or establish a communication.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for selecting enhanced originator information for transmission over a communications network, the method comprising: retrieving a service profile for a recipient terminal from a service profile database in response to initiation of a communication by an originator terminal to the recipient terminal, the service profile retrieved using a recipient terminal address in the communication initiation, the service profile specifying a service plan and a terminal capability of the recipient terminal to retrieve the enhanced originator information from the originator terminal; processing the service profile to determine types of information elements that the recipient terminal receives to perform an enhanced originator identification of the originator terminal; selecting multiple information elements associated with the originator terminal by retrieving the multiple information elements from a network database based upon the service plan and the terminal capability of the recipient terminal; and transmitting a communication including the multiple information elements to the recipient terminal prior to establishing a communications session with the recipient terminal; wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including: preventing an incoming call, in which a caller has information elements that have been blocked by the recipient pursuant to the service profile, from the recipient terminal; and forwarding a call that includes a video file as the information elements to a cellular telephone; wherein the information elements include advertising material and at least one of: a font and character style specification for displaying the advertising material in accordance with the terminal capability;
    a logo;
    audio;
    multi-media;
    animation;
    VPIM;
    a uniform resource locator;
    video; and
    an alerting tone.

2. The method of claim 1, wherein the terminal capability relates to at least one of a:
    terminal device type including at least one of:
        a personal computer;
        a network computer;
        a wireless mobile telephone;
        a wireless mobile computer device;
        a facsimile;
        a network appliance; and
        a wireline telephone; and
    terminal device technology features including at least one of:
        a binary-based caller identification feature; and
        graphical features.

3. The method of claim 1, wherein the communication comprises at least one of:
    voice;
    data;
    video;
    messaging;
    instant messaging; and
    paging.

4. The method of claim 1, wherein the communication including the multiple information elements is generated by the communications network.

5. The method of claim 1, wherein the communications network includes at least one of:
    a circuit-switched network;
    a packet-switched network;
    a wireless network;
    an asynchronous transfer mode network; and
    a Multiprotocol Label Switching (MPLS) network.

6. The method of claim 1, wherein the service plans are stored in the service profile database, the plans stored in a dual format operable for accommodating both graphically-enabled caller identification devices and caller identification devices that are not graphically enabled.

7. A storage medium including machine-readable computer program code for transmitting enhanced originator information over a communications network, the storage medium including instructions for causing a server to implement a method comprising: retrieving a service profile for a recipient terminal from a service profile database in response to initiation of a communication by an originator terminal to the recipient terminal, the service profile retrieved using a recipient terminal address in the communication initiation, the service profile specifying a service plan and a terminal capability of the recipient terminal; selecting multiple information elements associated with the originator terminal from a network database by retrieving the multiple information elements based upon the service plan and the terminal capability of the recipient terminal; providing an identification of the originator terminal based on information elements that the recipient terminal receives based on the service profile, the identification being associated with an enhanced identification communication; and transmitting the enhanced identification communication including the multiple information elements to the recipient terminal prior to establishing a communications session with the recipient terminal; wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including: preventing an incoming call, in which a caller has information elements that have been blocked by the recipient pursuant to the service profile, from the recipient terminal; and forwarding a call that includes a video file as the information elements to a cellular telephone; wherein the information elements include advertising material and at least one of: a font and character style specification for displaying the advertising material in accordance with the terminal capability;
    a logo;
    an image;
    audio;
    multi-media;
    animation;
    VPIM;
    a uniform resource locator;

video; and an alerting tone.

8. The storage medium of claim 7, wherein the terminal capability relates to at least one of a:

terminal device type including at least one of:
- a personal computer;
- a network computer;
- a wireless mobile telephone;
- a wireless mobile computer device;
- a facsimile;
- a network appliance; and
- a wireline telephone; and terminal device technology features including at least one of:
- a binary-based caller identification feature; and
- graphical features.

9. The storage medium of claim 7, wherein the communication comprises at least one of:
- voice;
- data;
- video;
- messaging;
- instant messaging; and
- paging.

10. The storage medium of claim 7, wherein the communication including the multiple information elements is generated by the communications network.

11. The storage medium of claim 7, wherein the communications network includes at least one of:
- a circuit-switched network;
- a packet-switched network;
- a wireless network;
- an asynchronous transfer mode network; and
- a Multiprotocol Label Switching (MPLS) network.

12. The storage medium of claim 7, wherein the service plans are stored in the service profile database, the plans stored in a dual format operable for accommodating both graphically-enabled caller identification devices and caller identification devices that are not graphically enabled.

13. A system for transmitting enhanced originator information over a communications network comprising: a caller identification-enabled recipient terminal, the recipient terminal operating over a communications network via a service provider; an originator terminal operating over a communications network via a service provider; a network-based originator communications information database; a service profile database for the originator terminal to retrieve a service profile of the recipient terminal to determine types of information elements representing enhanced originator information identifying the originator terminal, which the recipient terminal receives; and an originator identification system executed by the communications network, the originator identification system performing: retrieving a service profile for the recipient terminal from the service profile database in response to initiation of a communication by the originator terminal to the recipient terminal, the service profile retrieved using a recipient terminal address in the communication initiation, the service profile specifying a service plan and a terminal capability of the recipient terminal; selecting multiple information elements associated with the originator terminal from the network-based originator communications information database by retrieving the multiple information elements based upon the service plan and the terminal capability of the recipient terminal; and transmitting a communication including the multiple information elements to the recipient terminal prior to establishing a communications session with the recipient terminal; wherein the service plan includes options including controlling presentation of the communication on the recipient terminal by screening the multiple information elements in the communication based upon at least one of content or format of the multiple information elements, the screening performed based upon criteria configured by a user of the recipient terminal, the screening including: preventing an incoming call, in which a caller has information elements that have been blocked by the recipient pursuant to the service profile, from the recipient terminal; and forwarding a call that includes a video file as the information elements to a cellular telephone; wherein the information elements include advertising material and at least one of: a font and character style specification for displaying the advertising material in accordance with the terminal capability;
- a logo;
- an image;
- audio;
- multi-media;
- animation;
- VPIM;
- a uniform resource locator;
- video; and
- an alerting tone.

14. The system of claim 13, wherein the service profile database stores service plans and terminal capabilities, the terminal capabilities relating to at least one of a:

terminal device type including at least one of:
- a personal computer;
- a network computer;
- a wireless mobile telephone;
- a wireless mobile computer device;
- a facsimile;
- a network appliance; and
- a wireline telephone; and terminal device technology features including at least one of:
- a binary-based caller identification feature; and
- graphical features.

15. The system of claim 13, wherein the communication comprises at least one of:
- voice;
- data;
- video;
- messaging;
- instant messaging; and
- paging.

16. The system of claim 13, wherein the communications network includes at least one of:
- a circuit-switched network;
- a packet-switched network;
- a wireless network;
- an asynchronous transfer mode network; and
- a Multiprotocol Label Switching (MPLS) network.

17. The method of claim 1, wherein the transmitting is conducted over at least one of:
- an Internet Protocol network;
- a public switched telephone network;
- a wireless local area network;
- a wireless network;
- a cable network;
- a fiber optic network;
- a peer-to-peer network;
- a video network; and
- a satellite network.

18. The storage medium of claim 7, wherein the transmitting is conducted over at least one of:
- an Internet Protocol network;

a public switched telephone network;
a wireless local area network;
a wireless network;
a cable network;
a fiber optic network;
a peer-to-peer network;
a video network; and
a satellite network.

19. The system of claim 13, wherein the transmitting is conducted over at least one of:
an Internet Protocol network;
a public switched telephone network;
a wireless local area network;
a wireless network;
a cable network;
a fiber optic network;
a peer-to-peer network;
a video network; and
a satellite network.

* * * * *